Figure 1:
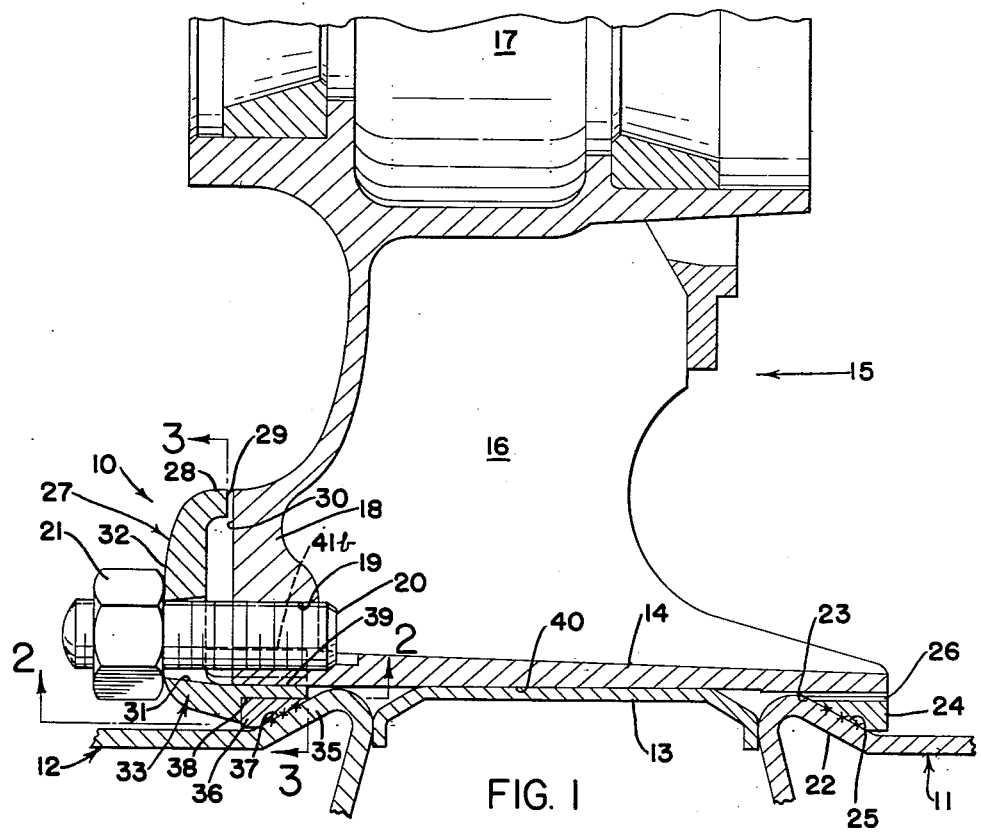

June 19, 1962   D. A. WALTHER   3,039,824
RIM CLAMPING DEVICE
Filed Jan. 12, 1960   3 Sheets-Sheet 1

INVENTOR.
DANIEL A. WALTHER
BY
ATTORNEYS

June 19, 1962     D. A. WALTHER     3,039,824
RIM CLAMPING DEVICE

Filed Jan. 12, 1960     3 Sheets-Sheet 2

*INVENTOR.*
DANIEL A. WALTHER
BY
ATTORNEYS

June 19, 1962  D. A. WALTHER  3,039,824
RIM CLAMPING DEVICE
Filed Jan. 12, 1960  3 Sheets-Sheet 3
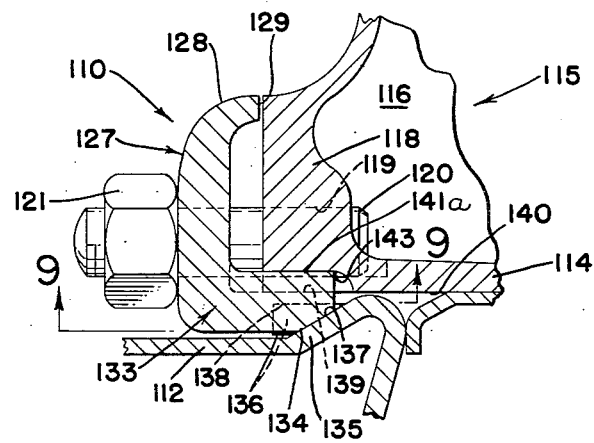
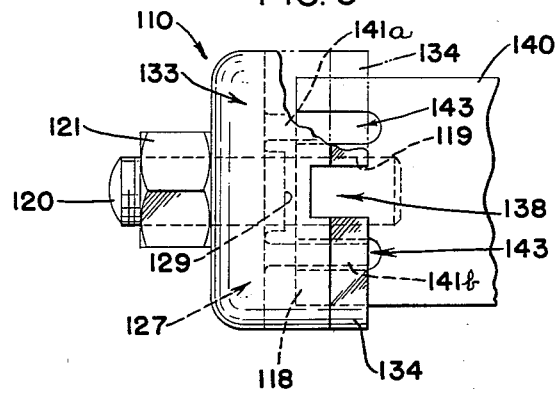
INVENTOR.
DANIEL A. WALTHER
BY
ATTORNEYS United States Patent Office 3,039,824
Patented June 19, 1962

3,039,824
RIM CLAMPING DEVICE
Daniel A. Walther, Dayton, Ohio, assignor to The Dayton Steel Foundry Company, Dayton, Ohio, a corporation of Ohio
Filed Jan. 12, 1960, Ser. No. 1,896
14 Claims. (Cl. 301—20)

The present invention relates generally to a clamping device for rim and wheel assemblies. More particularly, the invention relates to an improved rim clamp whereby single or dual mounted rims, as used on vehicles such as trucks, tractors and trailers may be demountably secured to a wheel. Specifically, the invention relates to a rim clamp which provides a positive, or non-slip, driving connection between the rim or rims and the wheel on which said rim or rims are mounted.

The prior art has seen countless types and forms of single and dual rim clamps. An early type clamping device comprised a triangularly shaped continuous split wedge ring which was securingly inserted between a tapered face on the felly, be the felly continuous or merely the radially outer terminal surface of the spokes, and a corresponding face on the inner diameter of the rim. The axially outer surface of this ring was engaged by a series of clamping lugs which could be tightened against the ring by appropriately located nuts and bolts. See, for example, U.S. Patent No. 1,869,635.

In another form the wedge ring per se was replaced by a series of clamping lugs having lateral portions oriented axially of the wheel. This axially disposed section of the clamp was provided with a radially inward surface adapted to having sliding engagement with the felly and a radially outward surface adapted to have wedging engagement with a flange on the rim. See, for example, U.S. Patent No. 2,874,997.

However, the use of these rim clamps did not assure a positive driving connection between the rim and the wheel. The driving force imparted through the drive shaft, differential and axle to the wheel was transmitted to the rim and its road contacting tire solely by the frictional contact between the wheel-wedge member-rim configuration. The braking force was similarly imparted.

As often occurs, the tightening nuts can work loose or be insufficiently tightened when the rim is mounted on the wheel and the requisite frictional force be absent. This results in rim slippage which causes loss of motive power as well as undue wear on the tire itself. Or, if the mechanic mounting the rim on the wheel excessively tightens the nuts to prevent rim slippage he may make it extremely difficult to remove the rim at a later time; he may easily cause rim deformation and subsequent tire failure while the vehicle is in motion; or, he may over-tighten one nut before the others and cause the rim to be mounted at a cant from true perpendicular with respect to the rotational axis of the wheel and thus cause tire damaging rim wobble.

Therefore, it is an object of the present invention to provide improved concepts of clamps for mounting single or dual rims which assures a positive, non-slip, mechanical driving connection between the rim or rims and the wheel upon which the rim or rims are mounted.

It is a further object of the present invention to provide such a driving connection rim clamp which is adapted for use with a wheel having an integrated continuous felly or a wheel with a hub and spokes having free ends with an interrupted felly surface.

It is a still further object to provide such a driving connection rim clamp which permits ease of assembly and disassembly.

These and other objects of the invention, as well as the advantages thereof, will be apparent in view of the following detailed description and the attached drawings.

Figure 2:
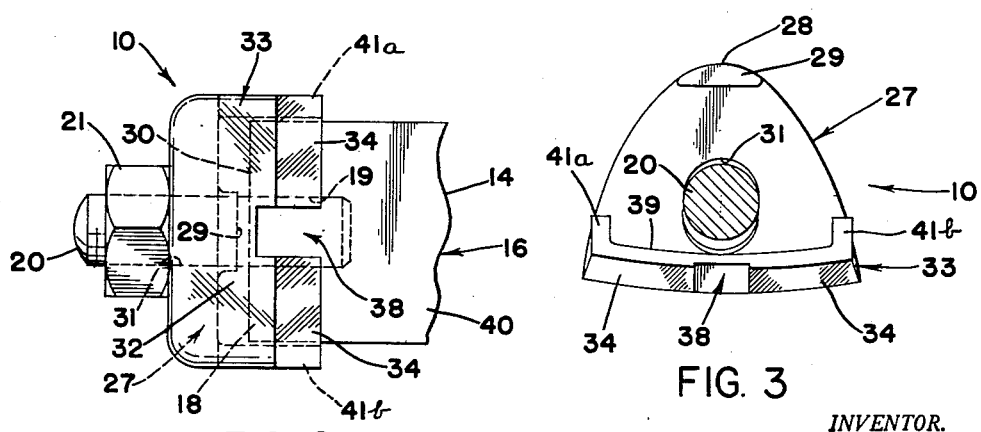
Figure 3:
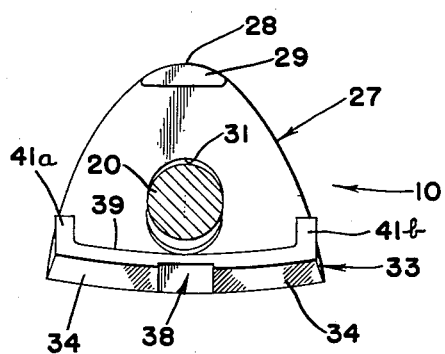
Figure 4:
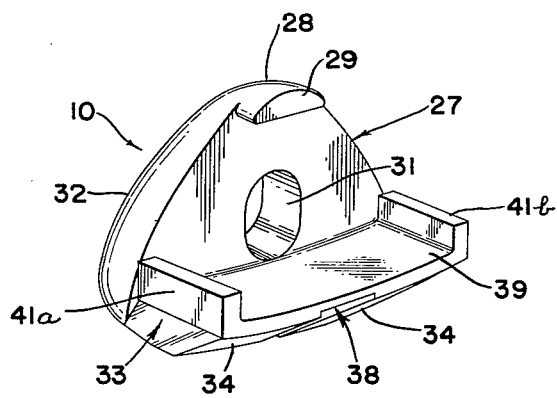
Figure 5:
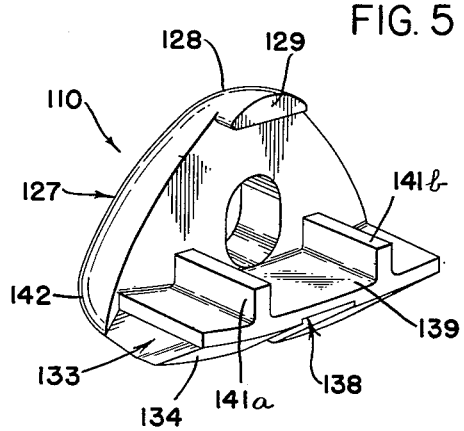
Figure 6:
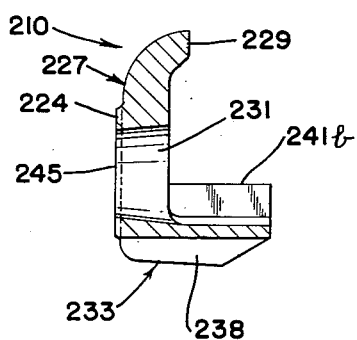
Figure 7:
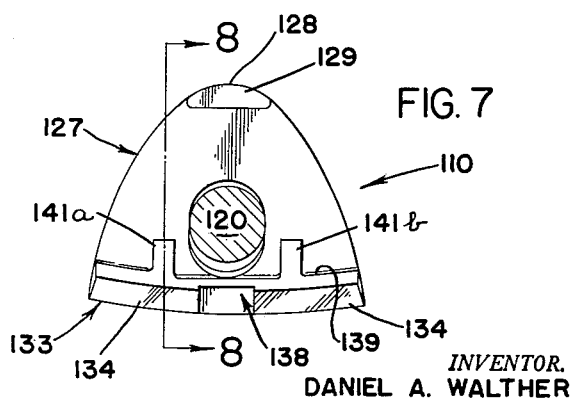

In the drawings:
FIG. 1 is a fragmentary sectional view showing a rim clamp according to the invention as used with a dual wheel assembly;
FIG. 2 is a bottom plan view taken substantially as indicated on line 2—2 in FIG. 1;
FIG. 3 is a back elevational view taken substantially as indicated on line 3—3 in FIG. 1;
FIG. 4 is a perspective view of the rim clamp;
FIG. 5 is a perspective view of a modified form of the rim clamp according to the invention;
FIG. 6 is a sectional view of the rim clamp of FIG. 5, showing a further modification;
FIG. 7 is a back elevational view of the rim clamp of FIG. 5;
FIG. 8 is a sectional view (similar to FIG. 1), showing the modified rim clamp of FIG. 5 as used with a dual wheel assembly; the view being taken substantially as indicated on line 8—8 in FIG. 7; and
FIG. 9 is a bottom plan view taken substantially as indicated on line 9—9 in FIG. 8.

A rim clamp according to the invention is generally L shaped in cross section, having an upright leg or bolt supported portion extending radially inward along the axially outer face of a wheel, and a horizontal base leg or lateral portion substantially perpendicular to said bolt supported portion and extending axially inward along the radially outer surface of a wheel. The rim clamp is characterized by an axial slot, in the outer or rim engaging surface or face of the lateral portion, adapted to engage a driving lug located on the mounting flange of an otherwise conventional rim.

The clamp is further characterized in that the inner surface of the laterally extending or horizontal leg portion is provided with axially aligned projections adapted to be positioned within accommodating axial grooves on the felly or outer surface of the wheel, or, in the alternative, to straddle the free ends of the spokes on wheels having an interrupted felly surface.

Referring now to FIG. 1, the form of rim clamp according to the invention is indicated generally by the numeral 10. An inner rim 11 and an interchangeable outer rim 12, separated by a suitable spacer 13, are mounted on felly 14 of a conventional wheel, indicated generally by the numeral 15. The wheel 15 may have any number of spokes 16 extending from a conventional hub area 17.

Wheel 15 is further provided with a plurality of bosses 18, shown at the radially outward terminal portions of spokes 16, having threaded bores 19, for attaching the rim clamps 10, as by stud bolts 20 and nuts 21.

The inner rim 11 has a conventional mounting flange 22 which is wedgingly seated on a standard (e.g. 28°) radially bevelled rim mounting surface 23 on the axially inner portion of the wheel felly 14. A series of driving lugs 24 are fixed, as by welding, to the radially inward surface 25 of the mounting flange 22 of the rim and are received within a series of axially disposed slots 26 located at spaced intervals around the periphery of the mounting surface 23 of the wheel. The engagement of each lug 24 in a slot 26 provides a positive mechanical driving connection between the inner rim 11 and wheel 15.

Referring also to FIGS. 3 and 4, the radially oriented upright leg or bolt supported portion 27 of a clamp 10 is substantially parabolic in shape (as viewed in FIG. 3). The vertex 28 of this portion is directed radially inwardly when the clamp is in operative position on the wheel 15. A heeling shoulder 29 extends axially inwardly from vertex 28. The use of a heeling shoulder 29 to abut the axially outer surface 30 of boss 18 prevents undue "cocking" of the clamp 10 as nut 21 is tightened and thus tends to prevent undesirable radial rim deforming stresses. Portion 27 also has a bore 31 therethrough which is circular at its axially outer end but which, from this end toward the axially inner end, preferably progressively enlarges radially to permit slight rocking about fixed stud bolt 20.

The axially outer face 32 of portion 27 preferably presents a slightly convex stress aligning surface against which nut 21 is tightened. This prevents undesired flexural stress to stud bolt 20 by maintaining the contact of nut 21 and clamp 10 in alignment with the axis of stud bolt 20.

The axially oriented lateral leg or horizontal base portion 33 of clamp 10 has a radially outward rim mounting conical surface 34, having a standard (e.g. 28°) bevel, for wedgingly engaging the conventional mounting flange 35 of the outer rim 12. A series of driving lugs 36, similar to lugs 24 on the inner rim, are fixed to the radially inward surface 37 of the mounting flange 35 of the rim. Each clamp 10 has an axially extending slot 38 on the radially outward side of lateral portion 33 which engages a lug 36 to provide a positive mechanical driving connection between the outer rim 12 and wheel 15.

Each clamp 10 is intended to closely engage the axially outer radially outward surface 40 of the wheel felly 14. Thus, the radially inward side 39 of a clamp 10 has a cylindrical configuration conforming with the curvature of felly surface 40.

As best seen in FIGS. 3 and 4, two axially directed parallel projections 41a and 41b are located transversely of the cylindrical clamp surface 39 and define the circumferential boundaries thereof. In reference to a wheel 15 these projections are axially oriented and directed radially inwardly from surface 39. The particular configuration represented in FIG. 2 shows the clamp 10 mounted on a wheel 15 which has an interrupted felly 14, the spokes 16 terminating in free ends. When clamp 10 is used with this type wheel construction, the projections 41a and 41b closely straddle the free or outer end of a spoke 16 to assist in transferring the rotational forces between the wheel 15 and clamp 10 and thereby reduce the flexural stresses caused by the circumferentially directed forces on bolt 20.

FIGS. 5 and 7-9 show an alternative form of rim clamp according to the invention, indicated generally by the numeral 110. The bolt supported portion 127 has a vertex 128 from which a heeling shoulder 129 extends axially inwardly. The lateral portion 133 of a clamp 110 has a bevelled surface 134 for wedgingly engaging the conventional mounting flange 135 of the outer rim 112. A series of driving lugs 136, similar to lugs 36 (FIG. 1), are fixed to the radially inward surface 137 of the mounting flange 135 of the rim. Each clamp 110 has an axially disposed slot 138 on the radially outward side of lateral portion 133 for engaging a driving lug 136. As shown, the slot 138 does not extend through or penetrate the radially inward or cylindrical surface 139 of the clamp lateral portion. However, a fully bifurcated or split lateral portion is contemplated as being within the scope of the invention.

As described above, the clamps 10 have projections 41a and 41b, which closely straddle the outer end of a plurality of spokes 16. The clamps 110 are intended to be engaged within specially adapted slots on the free or outer end of each spoke 116.

As best seen in FIGS. 5 and 7, two parallel projections 141a and 141b are disposed transversely of the cylindrical clamp surface 139 medially of the circumferential boundaries thereof.

As best seen in FIGS. 8 and 9, in reference to a wheel these projections 141a and 141b are axially oriented and are directed radially inwardly along cylindrical surface 139. The clamp 110 is shown engaging an outer rim 112 of a typical dual wheel assembly on wheel 115 having spokes 116. Wheel 115 is provided with a plurality of bosses 118 which are located at the radially outward terminal portion of spokes 116 and have a threaded bore 119 for attaching the rim clamp 110 as by stud bolts 120 and 121. The axially outer surface 140 of felly 114 is provided with a series of axially directed slots 143 circumferentially spaced to receive two axially directed parallel eared projections 141a and 141b.

FIG. 8 best shows the concepts of improved mechanical driving connections provided by a clamp according to the invention. The driving lug 136, affixed to the mounting flange 137 of outer rim 112 interacts with an axially extending slot 138 in the lateral portion 133 of clamp 110 to provide assured mechanical transmission of the circumferential force between the rim 112 and the clamp 110. The pair of eared projections 141a and 141b interact with the axial slots 143 on felly surface 140 to provide an immediate or close, mechanical transmission of the circumferential forces between the clamp 110 and the wheel 115, thus relieving the flexural stresses to stud bolt 120.

It should be observed that the two forms of the clamp, 10 and 110, are shown by FIGS. 2 and 9, respectively, as used on a wheel having spokes with free ends, an interrupted felly. However, either form could also be used with a wheel having a continuous felly. Slots similar to those indicated at 143 in FIG. 9 would then be required on the felly surface for the use of either form. The spaced relation of the slots would be determined by the location of the eared projections on the particular clamp to be used.

FIG. 6 depicts a modified form of rim clamp according to the invention in which the clamp 210 is provided with a driving lug engaging slot 238 extending axially the entire length of the lateral portion 233. The upright leg 227 has a heeling shoulder 229 and a bore 231. The axially outer surface of leg 227 is also provided with a shoulder 224 encircling the outer end of bore 231 to define a radially flat nut engaging surface 245. The eared projections as indicated at 241b may be spaced apart either as in FIG. 4 or as in FIG. 5.

The concepts of the invention provide for the mounting of single or dual rims in a positive, non-slip manner. While several forms of rim clamps embodying the invention have been shown and described, it will be apparent that modifications could be made therein without departing from the scope of the invention as defined in the appended claims.

What is claimed is:

1. The combination of a wheel having a rim mounting felly, a rim having a mounting flange and a driving lug on the radially inward surface of said flange, and a demountable rim clamp, said clamp comprising an upright bolt supported portion and a horizontal lateral portion, said lateral portion having, a radially inward felly engaging surface, axially extending projections on said felly engaging surface engaging said felly, a radially outward rim mounting surface and an axially extending slot in said rim mounting surface engaging said rim driving lug.

2. The combination of a wheel having a rim mounting felly, a rim having a mounting flange and a series of driving lugs on the radially inward surface of said flange, a series of fastening means on the axially outer face of said wheel radially inward of said felly, and a series of demountable rim clamps, said rim clamps each having an upright leg radially oriented to said wheel and engaged by one of said fastening means and a lateral leg axially oriented to said wheel, said lateral leg having a radially outward rim mounting surface, an axially extending slot engaging one of said rim driving lugs, a radially inward felly engaging surface, and axially extending projections on said felly engaging surface engaging said felly.

3. The combination of a wheel having a rim mounting felly, a rim having a mounting flange and a series of driving lugs on the radially inward surface of said flange, a series of fastening means on the axially outer face of said wheel radially inward of said felly, and a series of demountable rim clamps, said rim clamps each having an upright leg radially oriented to said wheel and engaged by one of said fastening means and a lateral leg axially oriented to said wheel, said lateral leg having a radially inward felly engaging surface, axially extending projections on said felly engaging surface engaging said felly, a radially outward rim mounting surface, and an axially extending slot for engaging one of said rim driving lugs.

4. The combination of a wheel having a plurality of radially directed spokes, each spoke having a rim mounting felly, and a rim clamp, said clamp comprising an upright bolt supported portion and a horizontal lateral portion, said lateral portion having a radially inward surface and a pair of axially directed projections thereon engaging the outer end of said spoke.

5. The combination of a wheel having a rim mounting felly, said felly having an axially inner rim mounting surface and a series of axially directed slots on the axially outer surface thereof, and a rim clamp, said clamp comprising an upright bolt supported portion and a horizontal lateral portion, said lateral portion having a radially inward surface and a pair of axially directed projections thereon for engagement with said felly slots.

6 The combination of a wheel having a plurality of radially directed spokes, each spoke having a rim mounting felly and fastening means on the axially outer face thereof, and a series of rim clamps, said rim clamps each having an upright leg radially oriented to said wheel and engaged by one of said fastening means, and a lateral leg axially oriented to said wheel, said lateral leg having a radially inward surface and a pair of axially directed projections thereon engaging the outer end of said spoke.

7. The combination of a wheel having a rim mounting felly, said felly having an axially inner rim mounting surface and a series of axially directed slots on the axially outer surface thereof, a series of fastening means on the axially outer surface of said wheel, and a series of rim clamps, said rim clamps each having an upright leg radially oriented to said wheel and adapted for engagement by one of said fastening means, and a lateral leg axially oriented to said wheel, said lateral leg having a radially inward surface and a pair of axially directed projections thereon for engagement with said felly slots.

8. The combination of a wheel having a plurality of radially directed spokes, the felly of each spoke having an axially inner rim mounting surface, a rim having a mounting flange and a driving lug on the radially inward surface of said flange, and a rim clamp, said clamp comprising an upright bolt supported portion and a horizontal lateral portion, said lateral portion having a radially inward surface with a pair of axially directed projections thereon engaging the outer end of said spokes, a radially outward rim mounting surface and an axially extending slot engaging a rim driving lug.

9. The combination of a wheel having a rim mounting felly, said felly having an axially inner rim mounting surface and a series of axially directed slots on the axially outer surface thereof, a rim having a mounting flange and a driving lug on the radially inward surface of said flange, and a rim clamp, said clamp comprising an upright bolt supported portion and a horizontal lateral portion, said lateral portion having a radially inward surface with a pair of axially directed projections thereon for engagement with said felly slots, a radially outward rim mounting surface and an axially extending slot for engaging a rim driving lug.

10. The combination of a wheel having a felly for mounting dual rims and positioning a plurality of clamping devices, inner and outer rims mounted on said felly, mounting flanges on said rims, driving lugs affixed to said mounting flanges, a series of circumferentially spaced axially directed driving lug engaging slots on the axially inner portion of said felly receiving the driving lugs on said inner rim, a series of circumferentially spaced axially directed slots on the axially outer portion of said felly, said clamping device comprising an upright leg radially oriented to said wheel, an axial bore through said upright leg, a lateral leg axially oriented to said wheel, a conical rim engaging surface on the radially outer portion of said lateral leg, an axial slot on the radially outer portion of said lateral leg receiving a driving lug on said outer rim, a cylindrical felly engaging surface on the radially inner portion of said lateral leg, axially directed eared projections directed radially inward from said cylindrical surface engaging the axially outer slots on said felly, and tightening means on said wheel interconnecting said upright clamp leg to said wheel.

11. The combination of a wheel having a felly for mounting dual rims and positioning a plurality of clamp devices, inner and outer rims mounted on said felly, mounting flanges on said rims, driving lugs affixed to said mounting flanges, a series of circumferentially spaced axially directed driving lug engaging slots on the axially inner portion of said felly receiving the driving lugs on said inner rim, a series of circumferentially spaced axially directed slots on the axially outer portion of said felly, said clamping device comprising, an upright leg radially oriented to said wheel, an axial bore through said upright leg, a convex stress aligning surface on the axially outer face of said upright leg, a lateral leg axially oriented to said wheel, a conical rim engaging surface on the radially outer portion of said lateral leg, an axial slot on the radially outer portion of said lateral leg receiving the driving lug on said outer rim, a cylindrical felly engaging surface on the radially inner portion of said lateral leg, axially directed eared projections directed radially inward from said cylindrical surface engaging the axially outer slots on said felly, and tightening means on said wheel interconnecting said upright clamp leg to said wheel.

12. An article of manufacture for clamping a rim on a wheel comprising, a bolt supported portion and an angularly extending rim engaging lateral portion, said lateral portion having a slotted rim engaging surface on the outer face thereof, said slot being substantially perpendicular to said bolt supported portion, a cylindrical surface on the inner face of said flange, and eared projections on the face of said cylindrical surface substantially perpendicular to said bolt supported portion.

13. An article of manufacture for clamping a rim on a wheel comprising, a bolt supported portion and an angularly extending rim engaging lateral portion, a bore through said bolt supported portion and a heeling shoulder extending from said bolt supported portion in the same direction as said lateral portion, said lateral portion having a slotted rim engaging surface on the outer face thereof, said slot being substantially perpendicular to said bolt supported portion, a cylindrical surface on the inner face of said flange, and eared projections on the face of said cylindrical surface substantially perpendicular to said bolt supported portion.

14. An article of manufacture for clamping a rim on a wheel comprising, a bolt supported portion and an angularly extending rim engaging lateral portion, a bore through said bolt supported portion and a heeling shoulder extending from said bolt supported portion in the same direction as said lateral portion, an axially convex surface on the outer face of said bolt supported portion adjacent the rim of said bore, said lateral portion having a slotted rim engaging surface on the outer face thereof, said slot being substantially perpendicular to said bolt supported portion, a cylindrical surface on the inner face of said flange, and eared projections on the face of said cylindrical surface substantially perpendicular to said bolt supported portion.

References Cited in the file of this patent

UNITED STATES PATENTS

| | | |
|---|---|---|
| 1,383,679 | Wagenhorst | July 5, 1921 |
| 1,385,029 | Voorhees | July 19, 1921 |
| 1,563,810 | Wagenhorst | Dec. 1, 1925 |
| 1,617,999 | Forsyth | Feb. 15, 1927 |
| 1,697,797 | Swain | Jan. 1, 1929 |